United States Patent
Morales et al.

(10) Patent No.: US 6,738,618 B1
(45) Date of Patent: May 18, 2004

(54) METHOD AND SYSTEM FOR REGULATING AUTONOMOUS MESSAGING BY SUBSCRIBER UNITS IN A WIRELESS COMMUNICATION NETWORK

(75) Inventors: Linda Morales, Dallas, TX (US); Kim Chang, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 454 days.

(21) Appl. No.: 09/656,366

(22) Filed: Sep. 6, 2000

Related U.S. Application Data

(60) Provisional application No. 60/162,323, filed on Oct. 28, 1999.

(51) Int. Cl.[7] .............................................. H04M 3/00
(52) U.S. Cl. .................................... 455/419; 455/435.1
(58) Field of Search ................................. 455/419, 418, 455/403, 412.1, 466, 422, 435.1

(56) References Cited

U.S. PATENT DOCUMENTS

| | | | | |
|---|---|---|---|---|
| 4,775,999 A | * | 10/1988 | Williams | 455/435.1 |
| 5,873,043 A | * | 2/1999 | Comer | 455/458 |
| 5,943,425 A | * | 8/1999 | Mizikovsky | 455/419 |
| 5,987,317 A | * | 11/1999 | Venturini | 455/412.2 |
| 6,029,065 A | * | 2/2000 | Shah | 455/414.4 |
| 6,064,880 A | * | 5/2000 | Alanara | 455/419 |
| 6,223,028 B1 | * | 4/2001 | Chang et al. | 455/419 |
| 6,253,075 B1 | * | 6/2001 | Beghtol et al. | 455/415 |
| 6,292,669 B1 | * | 9/2001 | Meuronen et al. | 455/466 |
| 6,445,925 B1 | * | 9/2002 | Kwon et al. | 455/446 |
| 6,532,362 B1 | * | 3/2003 | Lee et al. | 455/419 |
| 2002/0037724 A1 | * | 3/2002 | Chatterjee et al. | 455/435 |

* cited by examiner

Primary Examiner—William Trost
Assistant Examiner—Sharad Rampuria
(74) Attorney, Agent, or Firm—John D. Crane; Dillon & Yudell LLP

(57) ABSTRACT

A wireless communication network generally includes a number of subscriber units, a base station controller, and a base station transceiver coupled to the base station controller. A parameter specifying an interval at which subscriber units in the wireless communication network are permitted to generate autonomous messages is stored, for example, in a system parameter database at the base station. The parameter is broadcast by the base station transceiver over-the-air to subscriber units in the wireless communication network. In response to receipt of the parameter, the subscriber units store the parameter and thereafter transmit autonomous message over-the-air only in accordance with the parameter. In one preferred embodiment, the parameter regulates how often autonomous messages can be transmitted by individual subscriber units. Alternatively or additionally, the parameter can be used to ensure that the subscriber unit is in a stable state before an autonomous message is transmitted by preventing transmission of autonomous messages while the subscriber unit is generating messages at too rapid of a rate.

42 Claims, 3 Drawing Sheets

METHOD AND SYSTEM FOR REGULATING AUTONOMOUS MESSAGING BY SUBSCRIBER UNITS IN A WIRELESS COMMUNICATION NETWORK

This application claims the benefit of Provisional application Ser. No. 60/162,323, filed Oct. 28, 1999.

BACKGROUND OF THE INVENTION

1. Technical Field

The present invention relates in general to wireless communication and, in particular, to the utilization of access channels in a wireless communication network. Still more particularly, the present invention relates to a method and system for regulating autonomous messaging by subscriber units in a wireless communication network.

2. Description of the Related Art

In cellular telephone networks, one widely utilized communication technology is CDMA (Code Division Multiple Access). CDMA is a spread spectrum technology that distributes the signal of interest (e.g., a voice or data signal) over a wide radio frequency spectrum. CDMA can be implemented with any of a number of air interface standards, including the cellular IS-95A and IS-2000 standards and the PCS (Personal Communications Services) ANSI J-STD-008 standard. Each of these standards defines two groups of channels, the forward channel and the reverse channel.

The forward channel, which communicates voice and data from the cell to mobile stations, carries traffic, a pilot signal, and overhead information. The pilot and overhead channels establish system timing and station identity. The pilot channel also is employed as a signal strength reference in the handoff process, which transfers communication with a mobile station to another base station in the wireless communication network. The reverse channel, which communicates voice and data from the mobile station to the cell, carries both traffic and signaling. Any particular reverse channel is active only during calls or signaling by or to the associated mobile station.

In the reverse channel, the channels utilized for signaling, that is, carrying control messages, from the mobile stations to the cell are referred to generically as access channels. Some access channels are available for use by all mobile stations (i.e., are shared access channels), while some are dedicated for use by particular mobile stations. Examples of control messages carried by the access channels include Origination Messages that initiate calls, Page Response Messages that provide responses to pages, Registration Messages that provide information regarding the locations and identities of mobile stations, and Flash With Information Messages that alert the cell to changes in the hook states of mobiles.

In conventional CDMA networks, mobile stations have been permitted to send autonomous messages, which are defined herein as control messages originated by a mobile station that are not prompted by a specific request by the cell, via the shared access channels in an uncontrolled manner. This lack of regulation can lead to excessive autonomous messaging, for example, by a malfunctioning mobile station. Excessive autonomous messaging may also result from a poor choice of system parameters that require a mobile station to provide too many control messages, poor cell boundary planning that causes a mobile station to repeatedly re-register with a base station as the mobile user traverses the cell boundary, or simply user error. Excessive autonomous messaging can consume the limited bandwidth of shared access channels, resulting in mobile users experiencing access delays, access failures, or even service outages.

SUMMARY OF THE INVENTION

In view of the problems that may result from unregulated autonomous messaging, the present invention provides a method and system for regulating autonomous messaging by subscriber units (e.g., mobile stations) in a wireless communication network. A wireless communication network in accordance with the present invention generally includes a number of subscriber units, a base station controller, and a base station transceiver coupled to the base station controller. A parameter specifying an interval at which subscriber units in the wireless communication network are permitted to generate autonomous messages is stored, for example, in a system parameter database at the base station. The parameter is broadcast by the base station transceiver over-the-air to subscriber units in the wireless communication network. In response to receipt of the parameter, the subscriber units store the parameter and thereafter transmit autonomous message over-the-air only in accordance with the parameter. In one preferred embodiment, the parameter regulates how often autonomous messages can be transmitted by individual subscriber units. Alternatively or additionally, the parameter can be used to ensure that the subscriber unit is in a stable state before an autonomous message is transmitted by preventing transmission of autonomous messages while the subscriber unit is generating messages at too rapid of a rate.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
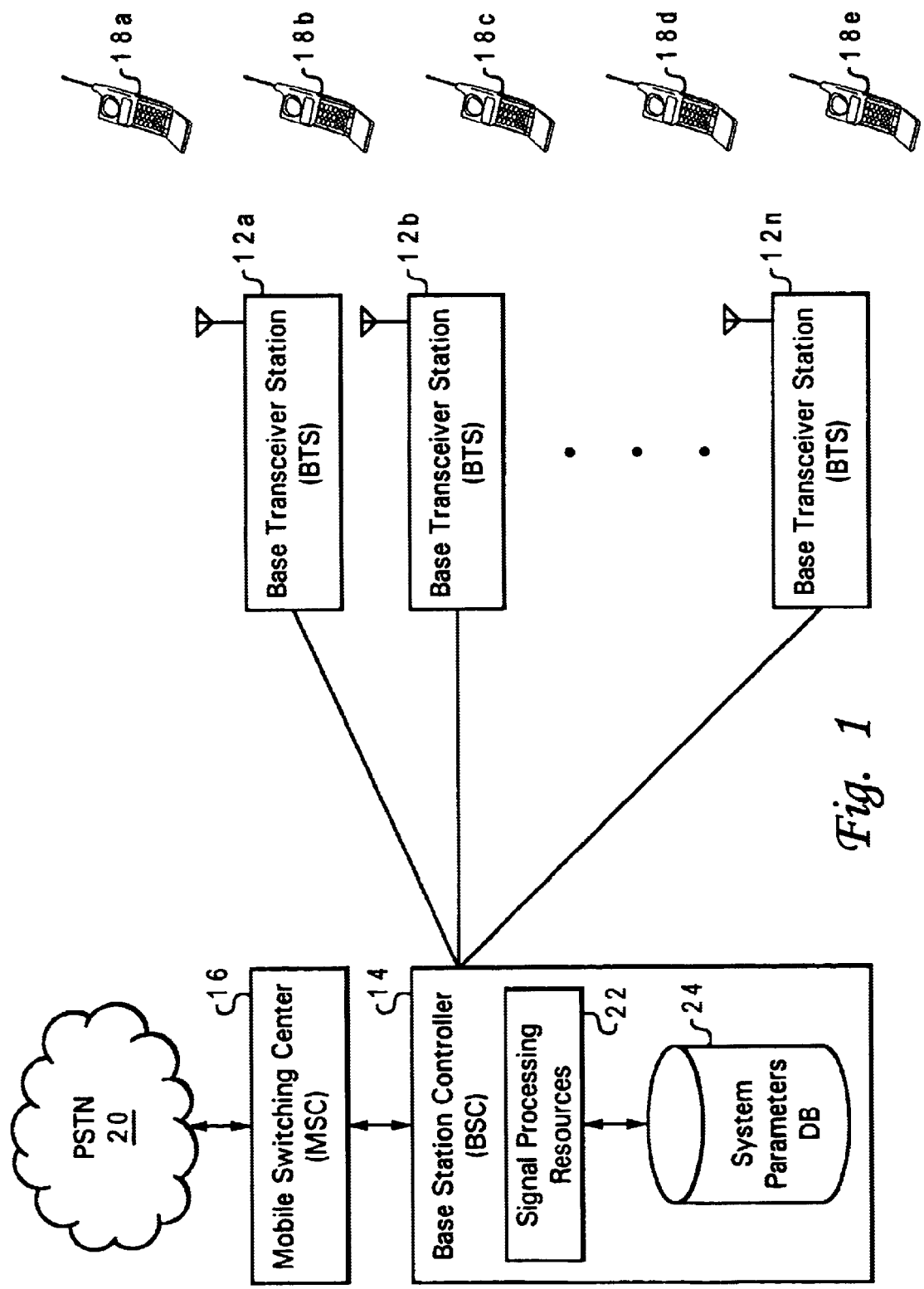
FIG. 1 depicts an illustrative embodiment of a wireless communication network with which the method and system of the present invention may advantageously be utilized.

Referring now to the drawings and in particular to FIG. 1, there is depicted a high-level diagram of a wireless communication network 10 in which a preferred embodiment of the present invention may advantageously be implemented. Wireless communication network 10 may utilize an analog protocol such as advanced mobile phone service (AMPS), but preferably employs a digital protocol such as code-division multiple access (CDMA). As shown, wireless communication network 10 includes a mobile switching center (MSC) 16 that supports various call, data and messaging functions for a multiple-access technology such as CDMA, as well as connectivity to a public switched telephone network (PSTN) 20. Coupled to BSC 14 is a base station controller (BSC) 14 that generally comprises signal processing resources 22, which may be implemented as one or more mid-range computer systems, and a system parameters database 24. BSC 14 controls the operation of several base transceiver stations (BTSs) 12a–12n distributed at various locations within communication network 10 in accordance with the system parameters stored in system parameters database 24. Within the service area of wireless communication network 10, there are also several mobile stations (also known as mobile subscriber units), such as mobile stations 18a, 18b, 18c, 18d and 18e, which transmit and receive calls, pages, data and control messages over-the-air with base transceiver stations 12a–12n. Although the present invention is described below with reference to mobile stations 18, those skilled in the art will appreciate from the following description that the present invention is also applicable to wireless local loop (WLL) implementations in which the subscriber units are generally fixed in a residence or business premises.

Figure 2:
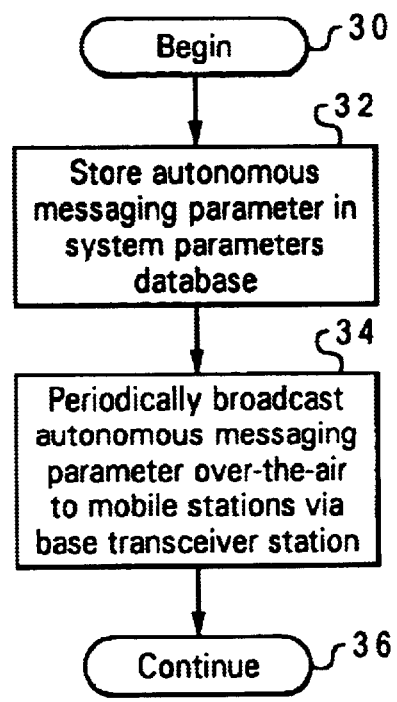
FIG. 2 is a high-level logical flowchart of a method of operating a base station controller in accordance with the present invention.

Referring now to FIG. 2, there is depicted a high-level logical flowchart of a method of operating base station controller (BSC) 14 in accordance with the present invention. As illustrated, the process begins at block 30 and thereafter proceeds to block 32, which depicts base station 14 storing in system parameters database 24 an autonomous messaging parameter that regulates autonomous messaging by mobile stations 18. The autonomous messaging parameter, which can be selected by the service provider, preferably defines a minimum time interval (referred to as the autonomous messaging interval) between autonomous messages transmitted by any one mobile station 18. As shown at block 34, BSC 14 periodically broadcasts the autonomous messaging parameter over-the-air to mobile stations 18 via BTSs 12. The autonomous messaging parameter is preferably provided in a field of an overhead System Parameters Message, which may be broadcast at a frequency of about once every 1 to 2 seconds (e.g., once every 1.28 seconds in an exemplary embodiment). For example, in a WLL implementation, the autonomous messaging parameter may be specified as the AUTO_WLL_INTERVAL of the Extended System Parameters Message defined by the TIA/EIA/IS-2000.5-A standard for Third Generation (3G) CDMA systems, which is incorporated herein by reference. Following block 34, the process proceeds to block 36, where processing by BSC 14 continues.

Figure 3:
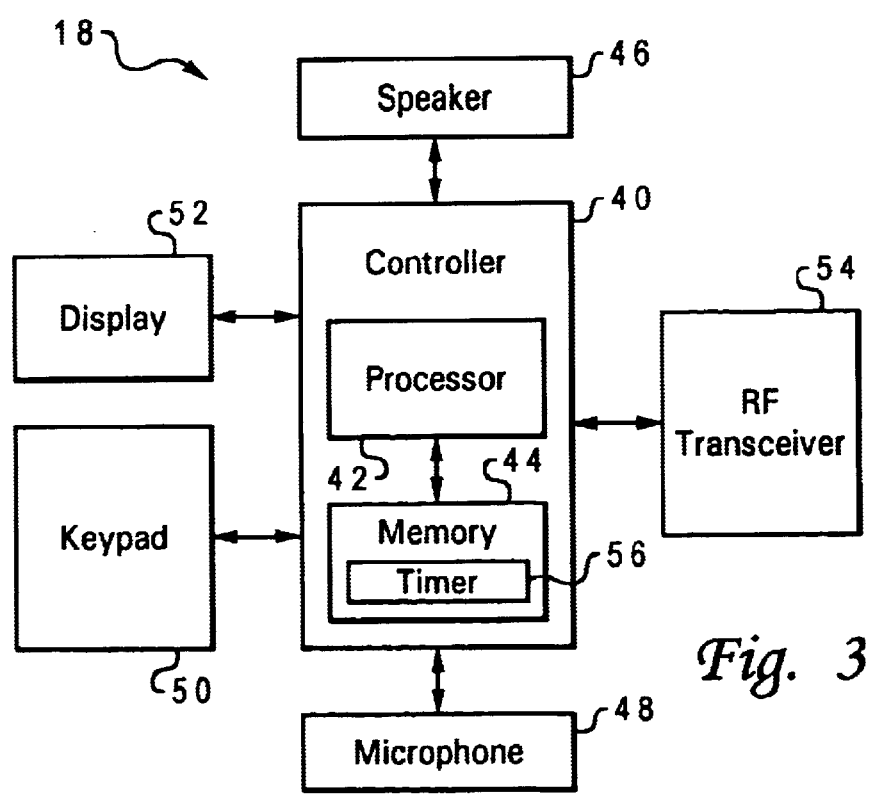
FIG. 3 is a high-level block diagram of a subscriber unit in accordance with the present invention.

With reference now to FIG. 3, there is illustrated a high-level block diagram of a mobile station 18 or other subscriber unit in accordance with the present invention. Mobile station 18 includes a controller 40 that generally includes a processor 42 and a memory 44. Processor 42 executes a control program stored within memory 44 to implement the subscriber unit side of the multiple-access protocol employed by wireless communication network 10. Mobile station 18 further includes a speaker (ear piece) 46 by which controller 40 presents audio outputs to a subscriber and a microphone (mouth piece) 48 that receives audio inputs from the subscriber. Mobile station 18 also has a keypad 50 by which the subscriber can enter callee telephone numbers and other keyed inputs and a display 52 through which controller 40 can visually present alphanumeric and graphical outputs for viewing by the subscriber. Finally, mobile station 18 includes a radio frequency transceiver 54 for sending and receiving wireless signals, including autonomous messages, over-the-air.

Figure 4:
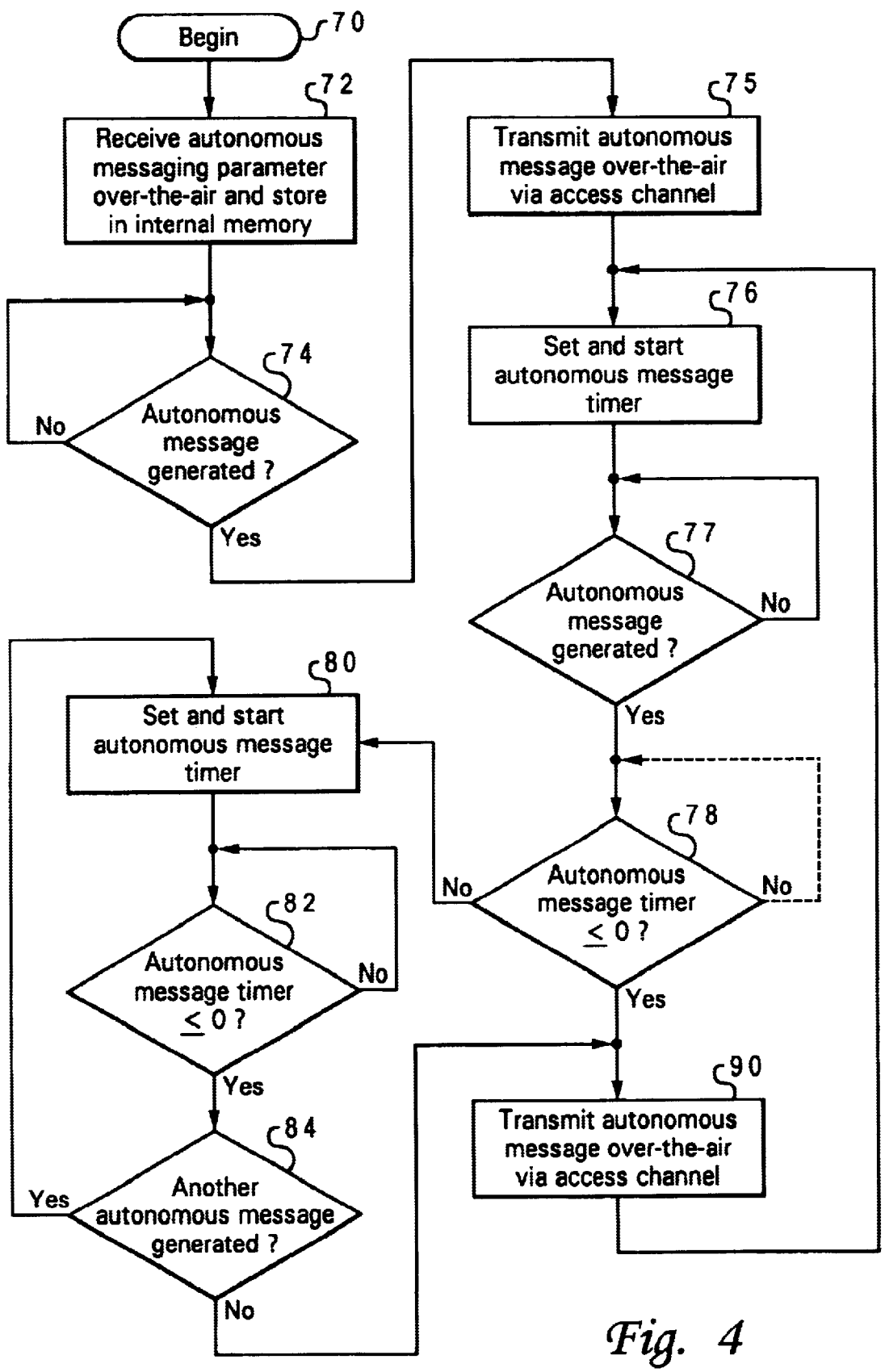
FIG. 4 is a high-level logical flowchart of a method of operating a subscriber unit in accordance with the present invention.

Referring now to FIG. 4, there is depicted a high-level logical flowchart of a method of operating a subscriber unit, such as a mobile station 18 or a fixed subscriber station, in accordance with the present invention. The process shown in FIG. 4 is preferably implemented as a portion of the control program executed by processor 42 to implement the subscriber side of the multiple-access protocol employed by wireless communication system 10.

As illustrated, the process shown in FIG. 4 begins at block 70 and thereafter proceeds to block 72, which depicts processor 42 of a mobile station 18 receiving the autonomous messaging parameter over-the-air from one of BTSs 12 and then storing the autonomous messaging parameter into memory 44. The process then iterates at block 74 until mobile station 18 generates an autonomous message to be sent over-the-air via one of the access channels. As noted above, a mobile station 18 may generate an autonomous message for any number of reasons. For example, a mobile station 18 or a fixed subscriber unit in a WLL may be required by the implemented protocol to notify BSC 14 of changes in its hook status so that BSC 14 can provide dial tone or other services. In the TIA/EIA/IS-2000.5-A standard incorporated by reference above, a subscriber unit is required to provide notification to the BSC of a change in hook status via a Flash With Information Message. Other types of autonomous messages include Short Message Service (SMS) messages, as well as the Origination Messages, Page Response Messages, and Registration Messages mentioned above.

Once mobile station 18 generates an autonomous message, processor 42 utilizes RF transceiver 54 to transmit the autonomous message over-the-air to a BTS 12 via an access channel of the reverse channel, as shown at block 75. Processor 42 then initializes an autonomous message timer 56 (which may be a variable in memory 44 as shown in FIG. 3) to an autonomous messaging interval specified by the autonomous messaging parameter and starts (e.g., begins decrementing) autonomous message timer 56 to track elapsed time, as shown at block 76. The purpose of autonomous message timer 56 is to prevent the sending of another autonomous message until an autonomous messaging interval specified by the autonomous messaging parameter has elapsed.

If mobile station 18 then generates another autonomous message to be sent over-the-air via one of the access channels, the process passes to block 78 via decision block 77. However, if mobile station 18 has not generated an autonomous message, the process simply iterates at block 77 until mobile station 18 generates another autonomous message. When mobile station 18 generates an autonomous message, processor 42 determines at block 78 whether or not autonomous message timer 56 has a value of zero or less, thereby indicating that the autonomous messaging interval between autonomous messages has elapsed. If so, the process proceeds from block 78 to block 90, which is described below. However, if processor 42 determines at block 78 that autonomous message timer 56 has a value greater than zero, then the autonomous message cannot be transmitted over-the-air at present without violating the autonomous messaging interval specified by the autonomous messaging parameter. FIG. 4 illustrates two alternative methods by which this operating scenario may be handled.

Blocks 80–84 depict a preferred embodiment in which transmission of the autonomous message is delayed until an entire autonomous messaging interval has elapsed without mobile station 18 generating another autonomous message. In this preferred embodiment, processor 42 re-initializes autonomous message timer 56 with the autonomous messaging interval at block 80 and then restarts autonomous message timer 56. As shown at blocks 82 and 84, if mobile station 18 generates another autonomous message prior to the expiration of autonomous message timer 56, then the process returns to block 80. Otherwise, the process passes from block 84 to block 90. Thus, in this preferred embodiment, which safeguards against excessive autonomous messaging by malfunctioning mobiles, an autonomous message generated by mobile station 18 will not be transmitted over-the-air to BTS 12 until autonomous messaging timer 56 expires (e.g., has a value less than or equal to zero) without mobile station 18 generating another autonomous message.

If this level of regulation of autonomous messaging is not desirable, the process shown in FIG. 4 can alternatively handle premature generation of an autonomous message by simply iterating at block 78 (as indicated by dashed line illustration) until autonomous message timer 56 reaches a value of zero and then preceding to block 90. Thus, in this alternative embodiment, only the transmission of autonomous messages is regulated, rather than both the stability of the subscriber station and the transmission of autonomous messages as in the preferred embodiment.

Following either block 78 or block 84, the process shown in FIG. 4 passes to block 90, which depicts processor 42 utilizing RF transceiver 54 to transmit the autonomous message detected at block 77 over-the-air to a BTS 12 via an access channel of the reverse channel. The receiving BTS 12 in turn sends the autonomous message to BSC 14 for appropriate handling by signal processing resources 22. Following transmission of the autonomous message from mobile station 18, the process shown in FIG. 4 returns to block 76, which has been described.

As has been described, the present invention provides an improved method and system for regulating autonomous messaging by subscriber units in a wireless communication network. In accordance with the present invention, an autonomous messaging parameter that indicates an autonomous messaging interval is broadcast to subscriber units in the wireless communication network. The subscriber units utilize the autonomous messaging parameter to regulate autonomous messaging, for example, by utilizing the autonomous messaging interval to ensure stability of subscriber stations that generate autonomous messages and/or by enforcing the autonomous messaging interval between transmission of autonomous messages. In this manner, judicious use of the limited bandwidth of shared access channels in the reverse channel is ensured.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to computer systems, mobiles and other data processing systems executing software, such as SIP clients, servers and proxies, that direct the functions of the present invention, it should be understood that present invention may alternatively be implemented as a program product for use with the above-mentioned and other data processing systems. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding program instructions that direct the functions of the present invention, represent alternative embodiments of the present invention.

What is claimed is:

1. A method for controlling autonomous messaging by a wireless subscriber unit, said method comprising:
   storing, in a subscriber unit, a parameter specifying a required time interval between autonomous messages;
   tracking compliance by said subscriber unit with said parameter utilizing a timer within said subscriber unit;
   generating an autonomous message within the subscriber unit independently of a value of said timer; and
   transmitting the autonomous message over-the-air from the subscriber unit only in response to said timer indicating that the subscriber unit is in compliance with the parameter.

2. The method of claim 1, and further comprising receiving the parameter over-the-air at the subscriber unit.

3. The method of claim 2, and further comprising broadcasting the parameter over-the-air to a plurality of subscriber units including the subscriber unit.

4. The method of claim 2, wherein receiving the parameter over-the-air comprises receiving the parameter over-the-air from a base station in an Extended System Parameters Message.

5. The method of claim 1, wherein:
   said tracking comprises tracking elapsed time between transmissions of autonomous messages by said subscriber unit; and
   said transmitting comprises transmitting the autonomous message from the subscriber unit only if the timer indicates that more than the time interval specified by the parameter has elapsed since a previous autonomous message has been transmitted from the subscriber unit.

6. The method of claim 1, wherein:
   tracking compliance by said subscriber unit comprises utilizing the time to track elapsed time since a previous autonomous message was generated by the subscriber unit;
   said transmitting comprises transmitting the autonomous message from the subscriber unit only if the timer indicates that a time interval specified by the parameter has elapsed since a previous autonomous message was generated by the subscriber unit; and
   said method further comprises if the timer indicates that the time interval specified by the parameter has not elapsed since a previous autonomous message was generated, delaying transmission of the autonomous message until a complete time interval has elapsed from the generation of the autonomous message without the subscriber unit generating another autonomous message.

7. The method of claim 1, wherein transmitting an autonomous message comprises transmitting a message indicating a change in hook status of the subscriber unit.

8. The method of claim 7, wherein the message comprises a Flash With Information Message.

9. The method of claim 1, wherein transmitting an autonomous message comprises transmitting an autonomous message via a Code Division Multiple Access (CDMA) reverse channel.

10. A method for controlling autonomous messaging by wireless subscriber units coupled to a wireless communication network, said method comprising:
   receiving a parameter over-the-air from a base station at each wireless subscriber unit coupled to a wireless communication network;

storing the parameter in each wireless subscriber unit, the parameter specifying a required time interval between autonomous messages transmitted by wireless subscriber units in the wireless communication network; and generating autonomous messages within the subscriber units independently of a value of said parameter.

11. The method of claim 10, wherein the parameter is received periodically at a regular interval.

12. The method of claim 11, wherein the regular interval is approximately once per second.

13. The method of claim 10, and further comprising:
transmitting an autonomous message over-the-air from each wireless subscriber unit at a frequency no greater than that specified by the parameter.

14. The method of claim 13, wherein:
said method further comprises tracking elapsed time between transmissions of autonomous messages by a subscriber unit with a timer; and
said transmitting comprises transmitting an autonomous message from the subscriber unit only if the timer indicates that more than a time interval specified by the parameter has elapsed since a previous autonomous message has been transmitted from the subscriber unit.

15. The method of claim 14, wherein:
said method further comprises utilizing a timer to track elapsed time since a previous autonomous message was generated by a subscriber unit;
said transmitting comprises transmitting an autonomous message from the subscriber unit only if the timer indicates that a time interval indicated by the parameter has elapsed since the previous autonomous message was generated by the subscriber unit; and
said method further comprises if the timer indicates that the time interval specified by the parameter has not elapsed since a previous autonomous message was generated, delaying transmission of the autonomous message until a complete time interval has elapsed from the generation of the autonomous message without the subscriber unit generating another autonomous message.

16. The method of claim 13, wherein transmitting an autonomous message comprises transmitting a message indicating a change in hook status of the subscriber unit.

17. The method of claim 16, wherein transmitting the message comprises transmitting a Flash With Information Message.

18. The method of claim 10, wherein the parameter is received via a Code Division Multiple Access (CDMA) forward channel.

19. The method of claim 18, wherein the parameter is received over-the-air in an Extended System Parameters Message.

20. A subscriber unit, comprising:
a wireless transceiver; and
a controller coupled to said wireless transceiver, said controller including a memory storing a parameter specifying a time interval between autonomous messages and a timer that tracks compliance by said subscriber unit with said parameter, wherein said controller generates autonomous messages independently of a value of said timer and regulates transmission of the autonomous messages over-the-air by the wireless transceiver in compliance with the parameter by reference to said timer.

21. The subscriber unit of claim 20, wherein said wireless transceiver comprises a receiver that receives the parameter over-the-air.

22. The subscriber unit of claim 20, wherein said controller permits transmission of an autonomous message from the subscriber unit only if the timer indicates that more than a time interval specified by the parameter has elapsed since a previous autonomous message has been transmitted from the subscriber unit.

23. The subscriber unit of claim 20, wherein said timer tracks elapsed time since a previous autonomous message was generated by the subscriber unit, wherein the processor permits transmission of an autonomous message from the subscriber unit only if the timer indicates that a time interval specified by the parameter has elapsed since a previous autonomous message was generated by the subscriber unit, and wherein, if the timer indicates that the time interval specified by the parameter has not elapsed since a previous autonomous message was generated, the controller delays transmission of the autonomous message until a complete time interval has elapsed from the generation of the autonomous message without the subscriber unit generating another autonomous message.

24. The subscriber unit of claim 20, said subscriber unit further including a hook switch, wherein the controller generates an autonomous message if a change in hook status occurs.

25. The method of claim 20, wherein the autonomous message comprises a Flash With Information Message.

26. The method of claim 20, wherein said wireless transceiver transmits and receives signals in a Code Division Multiple Access (CDMA) frequency band.

27. A system, comprising:
a base station controller including:
a parameter database, coupled to said signal processing resources, that stores an autonomous messaging parameter specifying a required minimum time interval between autonomous messages by any one subscriber unit, said autonomous messages being generated independently of said autonomously messaging parameter; and
signal processing resources that direct broadcast of the parameter;
a base transceiver station, coupled to the base station, that broadcasts the parameter over-the-air to a plurality of subscriber units.

28. The system of claim 27, wherein the base transceiver station broadcasts the parameter at a regular interval.

29. The system of claim 27, wherein the base transceiver station comprises a Code Division Multiple Access (CDMA) base transceiver station.

30. The system of claim 29, wherein the base transceiver station broadcasts the parameter over-the-air in an Extended System Parameters Message.

31. A method of controlling autonomous messaging of wireless subscriber units by a wireless communication network, said method comprising:
storing a parameter specifying a required minimum time interval between autonomous messages transmitted by any one wireless subscriber unit coupled to the wireless communication network, said autonomous messages being generated independently of said parameter; and
broadcasting the parameter over-the-air from a base station to each wireless subscriber unit coupled to the wireless communication network.

32. The method of claim 31, wherein the parameter is broadcast periodically at a regular interval.

33. The method of claim 32, wherein the regular interval is approximately once per second.

34. The method of claim 31, wherein the parameter is broadcast over-the-air in an Extended System Parameters Message.

35. A program product for controlling autonomous messaging by wireless subscriber units coupled to a wireless communication network, said program product comprising a control program encoded in a medium, said control program causing a wireless subscriber unit to perform the steps of:

receiving a parameter over-the-air from a base station at a wireless subscriber unit coupled to a wireless communication network;

in response to receipt of the parameter, storing a parameter in the wireless subscriber unit, the parameter specifying a required time interval between autonomous messages transmitted by wireless subscriber units in the wireless communication network; and generating autonomous messages within the subscriber unit independently of a value of said parameter.

36. The program product of claim 35, wherein said control program causes the wireless subscriber unit to perform the further step of:

transmitting an autonomous message over-the-air at a frequency no greater than that specified by the parameter.

37. The program product of claim 36, wherein said control program causes the wireless subscriber unit to perform the steps of:

tracking elapsed time between transmissions of autonomous messages by a subscriber unit with a timer; and transmitting an autonomous message from the subscriber unit only if the timer indicates that more than a time interval specified by the parameter has elapsed since a previous autonomous message has been transmitted from the subscriber unit.

38. The method program product of claim 36, wherein said control program causes the wireless subscriber unit to perform the steps of:

utilizing a timer to track elapsed time since a previous autonomous message was generated by a subscriber unit;

said transmitting comprises transmitting an autonomous message from the subscriber unit only if the timer indicates that a time interval indicated by the parameter has elapsed since the previous autonomous message was generated by the subscriber unit; and said method further comprises if the timer indicates that the time interval specified by the parameter has not elapsed since a previous autonomous message was generated, delaying transmission of the autonomous message until a complete time interval has elapsed from the generation of the autonomous message without the subscriber unit generating another autonomous message.

39. The program product of claim 36, wherein the message indicates a change in hook status of the wireless subscriber unit.

40. The program product of claim 39, wherein the message comprises a Flash With Information Message.

41. The program product of claim 35, wherein the parameter is received via a Code Division Multiple Access (CDMA) forward channel.

42. The program product of claim 41, wherein the parameter is received over-the-air in an Extended System Parameters Message.

* * * * *